Figures 1, 2:
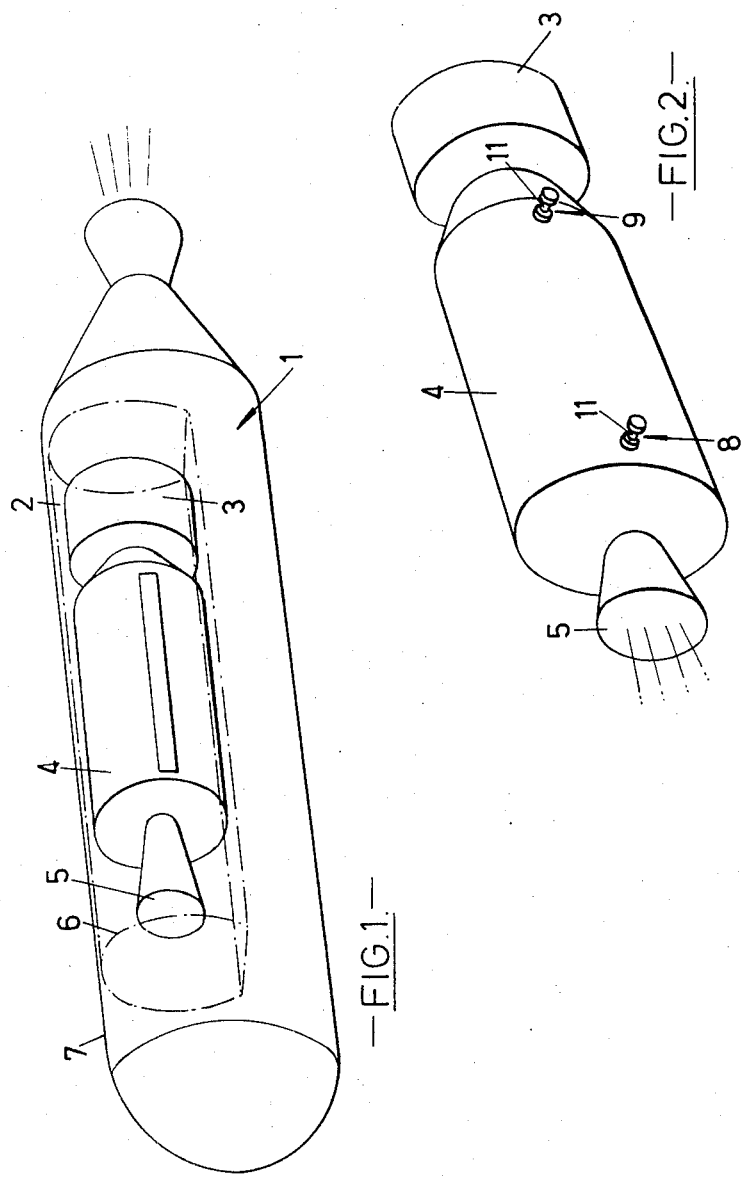

United States Patent [19]
Meston

[11] 3,815,849
[45] June 11, 1974

[54] APPARATUS FOR SUPPORTING A LOAD
[75] Inventor: Spencer Davidson Meston, Saltford, England
[73] Assignee: British Aircraft Corporation Limited, London, England
[22] Filed: June 14, 1973
[21] Appl. No.: 369,882

[30] Foreign Application Priority Data
June 22, 1972  Great Britain.................. 29345/72

[52] U.S. Cl................. 244/1 SS, 244/2, 244/137 R, 248/16
[51] Int. Cl.............................................. B64g 1/10
[58] Field of Search....... 244/1 SS, 2, 118 R, 137 R; 248/2, 16; 214/1 R, 1 D; 212/26; 254/93 R, 93 H

[56] References Cited
UNITED STATES PATENTS
| | | | |
|---|---|---|---|
| 2,697,569 | 12/1954 | Westcott | 244/118 R |
| 2,891,765 | 6/1959 | Pearne | 254/93 H X |
| 2,998,948 | 9/1961 | Sisk | 244/137 R |
| 3,450,376 | 6/1969 | Rusanovich et al. | 244/137 R |
| 3,674,240 | 7/1972 | Larsson | 254/93 R |
| 3,700,193 | 10/1972 | Bradley | 244/1 SS |

*Primary Examiner*—Milton Buchler
*Assistant Examiner*—Barry L. Kelmachter
*Attorney, Agent, or Firm*—Cushman, Darby & Cushman

[57] ABSTRACT

A support for supporting a load within a structure e.g. a space tub within a space shuttle, by means of a number of pairs of fluid devices, the devices of each pair being positioned at diametrically opposite sides of the load, and being interconnected by fluid interconnection means so as to resist relative similar movements between opposite sides of the load and the structure in a predetermined direction and in a predetermined plane but to allow limited differential movements between said opposite sides of the load and the structure in said predetermined direction in said predetermined plane.

9 Claims, 5 Drawing Figures

PATENTED JUN 11 1974

3,815,849

SHEET 1 OF 3

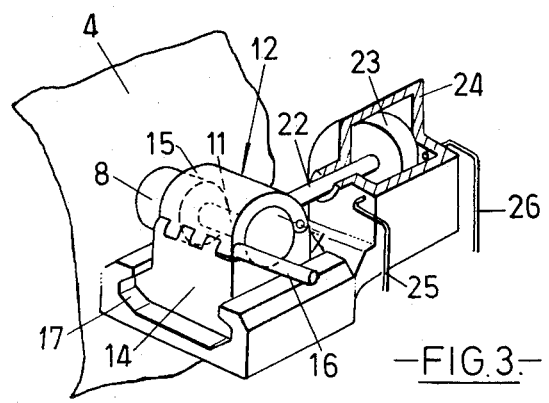
—FIG.3.—
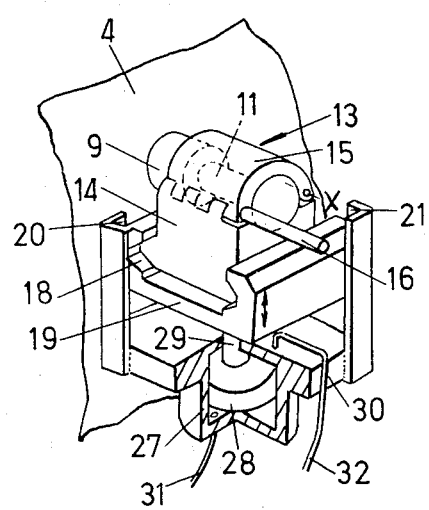
—FIG.4.—

APPARATUS FOR SUPPORTING A LOAD

This invention relates to apparatus for supporting a load within a structure and particularly to an apparatus for supporting one space vehicle within another.

One problem concerned with the supporting of a payload within a vehicle is that forces applied to the carrier vehicle due, particularly in the case of aircraft, to aerodynamic loads and in the case of space craft, to inertia loads exerted particularly during launch, cause the structure of the carrier vehicle to flex. If the payload is rigidly supported within the carrier vehicle, these flexing movements of the carrier vehicle are transmitted to the payload structure as bending moments, shear loads, axial loads and torsional loads. In order to react these moments and loads, it is necessary to increase the structural mass of the payload structure as compared with that necessary to merely support the weight of the payload under inertia loading only.

However, in air and space craft it is of primary importance to reduce the structural weight of the craft and its payload supporting structure in order that the maximum amount of payload may be carried. This is particularly so in the space field where the payload carried by a craft represents only a very small proportion of the total lift-off weight of the craft.

An object of the present invention is to provide an apparatus for supporting a load within a structure which apparatus is of considerably lower weight than has been achieved hitherto.

According to the present invention, apparatus for at least partially supporting a load on a structure includes at least one pair of fluid devices, the devices of each pair being positioned at diametrically opposite sides of the load, and fluid interconnection means interconnecting the devices of each pair so as to resist relative similar movements between opposite sides of the load and said structure in a predetermined direction and in a predetermined plane, but to allow limited differential movements between said opposite sides of the load and said structure in said predetermined direction and in said predetermined plane.

In one form of the invention two pairs of fluid devices and associated interconnecting means are arranged with their predetermined planes at angles to each other; the pairs of devices being spaced from each other in the lengthwise direction of the load.

Preferably, each fluid device includes a piston and cylinder operatively connecting the load and the structure.

Figure 5:
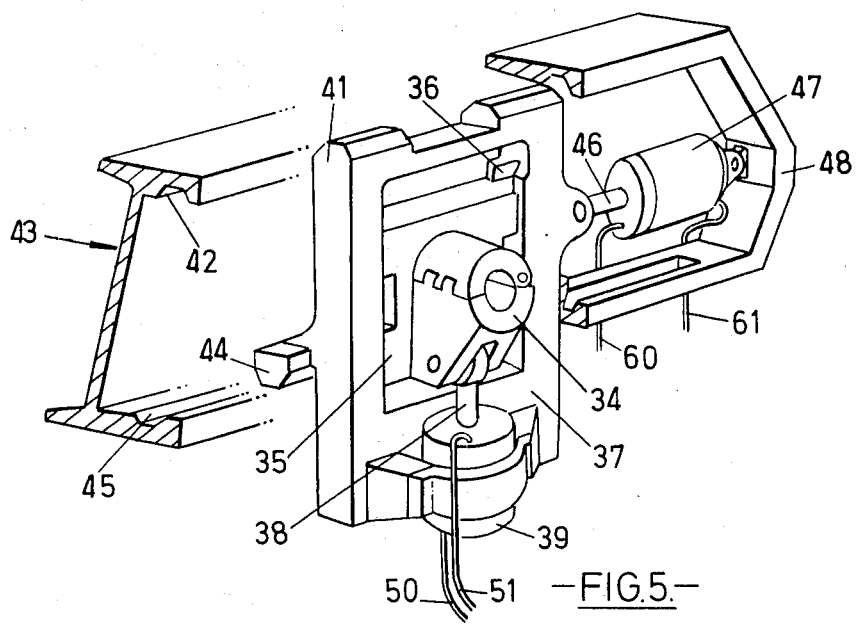

The invention will now be described with reference to the accompanying drawings in which:

FIG. 1 shows diagrammatically a space tug with its payload supported in a space shuttle, FIG. 2 shows the space tug with its payload released from its supports, FIG. 3 shows in greater detail the apparatus for supporting one side of the rear of the space tug, FIG. 4 shows in greater detail the apparatus for supporting one side of the front of the space tug, and FIG. 5 shows a support apparatus alternative to that shown in FIGS. 3 and 4.

Referring to the drawings, FIG. 1 shows a space craft 1 which is re-usable, that is to say, it may be launched with a payload into space under its own power and, in space it carries out a particular function before returning to earth to be readied for further use. Such a space craft is known as a space shuttle and it may be used to transport a payload of men, supplies, scientific equipment, etc. to and from space.

The space craft 1 is provided with a cargo bay 2 in which is carried a payload 3 connected to a rocket propulsion motor 4 having an exhaust nozzle 5 and known as a space tug. The combined tug and payload are releasable from the shuttle when the shuttle has reached a predetermined altitude. After release from the shuttle, the tug continues with the payload to its destination and, after delivering the payload the tug returns to the shuttle within which it is then secured whereupon the combined shuttle and tug return to earth.

Doors 6 and 7 are each hinged along one edge to the cargo bay surround and form an aerodynamic cover over the cargo bay 2 when the shuttle is in flight. The doors may be opened outwardly by means not shown, in order to allow the tug and payload to be loaded into or ejected from the cargo bay as required.

Two spigots, 8, 9 extend radially from each side of the tug 4, and each spigot is formed with a reduced diameter portion 11 for accurate location in respective socket members 12, 13 as shown in FIGS. 3 and 4 each socket member consisting of a base member or carriage 15. The free ends of the members 14, 15 are formed so as to interlock, and the ram of an electric motor 16 passing through the interlocking ends acts as a retaining pin. A further motor (not shown) is provided to open the clamp member 15 relative to the base member 14 about the hinge axis X after the ram driven by the electric motor 16 has been withdrawn, thereby releasing the spigot from the socket member.

The rearward socket member 12 is slidable in guideways 17 carried by the structure of the shuttle whilst the forward socket member 13 is slidable in guideways 18 in a member 19 which slidable in guides 20, 21 extending normal to the guideways 18 and which are fixed to the structure of the shuttle.

A piston rod 22 is coupled at one end to the base member 14 of socket 12, and at its other end to a piston 23 slidable within a cylinder 24 which is rigidly connected to the structure carrying the guideways 17.

The ends of the cylinder 24 associated with the rearward socket member 12 on one side of the tug are coupled to the ends of the cylinder 24 associated with the socket member 12 on the other side of the tug. Both ends of the cylinders are interconnected by pipes 25, 26 so that fluid in the cylinders may pass from one cylinder to the other. Similarly, a cylinder 27 is associated with the forward socket member 13, a piston 28 being coupled to the base member 19 by a piston rod 29. The cylinder is fixed to the guides 20 and 21 by a plate 30. The ends of the cylinder 27 associated with the forward socket member 13 on one side of the tug are coupled to the ends of the cylinder 27 associated with the socket member 13 on the other side of the tug, similar ends of the cylinders being interconnected by pipes 31 and 32 so that fluid in the cylinders has free passage from one cylinder to the other.

It can be seen that in use, axial loads in the shuttle structure are reacted equally by the two pistons 23 in the cylinders 24 and any relative displacement of the forward end supports of the tug relative to the rear end supports is automatically compensated for. Displacements caused by yawing of the shuttle structure are compensated for by the two pistons 23 being equally displaced in the cylinder 24 in opposite directions, thereby ensuring that no loads caused by the displacement of the shuttle structure are induced in the tug.

Similarly for torsional displacements, the shuttle structure at the forward end of the tug is able to rotate relative to the rear end without applying any torsionally induced loads into the tug structure as pistons 28 move in equal and opposite directions in cylinders 27.

An alternative form of support for one side of the rearward end of the space tug is shown in FIG. 5. In this arrangement, a socket member 34 for receiving spigot 9 is mounted on a plate 35 slidable vertically in guides 36 in a carrier 37. A piston rod 38 connects the socket member 34 to a piston within a cylinder 39 mounted on the carrier 37. The upper edge 41 of carrier 37 is engageable in a grooved track 42 in the upper part of a beam 43 extending along the shuttle structure whilst a shoe 44 cantilevered off the carrier 37 is engageable in a grooved track 45 in the lower part of the beam 43. A piston rod 46 connects the carrier 37 to a piston slidable within a cylinder 47 which is connected to the end 48 of the beam 43. Pipes 50, 51 and 60, 61 interconnect the respective ends of cylinders 39 and 47 with similar units positioned on the other side of the space tug. In this arrangement, the other end of the space tug will be supported by means of two socket members similar to that shown in FIG. 3. In this case, the piston and cylinder units will not be fitted and the two socket members will be free to slide in guideways on either side of the tug.

It can be seen that if the tug were rigidly supported in the shuttle at both ends, any flexure of the shuttle would induce bending loads etc in the tug other than those normally induced by inertia. In the proposed system, however, the tug is virtually floating within the shuttle and flexurally induced loads in the tug are practically eliminated.

What I claim is:

1. An aircraft or spacecraft structure of the kind incorporating a cargo bay and including a detachable load mounted within the bay wherein the load is at least partially supported within the bay by supporting means comprising, in combination, at least one pair of fluid devices, the devices of each pair being positioned at diametrically opposite sides of the load, and fluid interconnection means interconnecting the devices of each pair so as to resist relative similar movements between opposite sides of the load and said structure in a predetermined direction and in a predetermined plane, but to allow limited differential movements between said opposite sides of the load and said structure in said predetermined direction and in said predetermined plane.

2. Apparatus as claimed in claim 1 wherein the structure and the load are both space craft.

3. Apparatus as claimed in claim 1 including two pairs of said fluid devices and associated interconnection means arranged with the predetermined planes at angles to each other.

4. Apparatus as claimed in claim 3 wherein the said pairs of fluid devices are spaced from each other in the lengthwise direction of the load.

5. Apparatus as claimed in claim 1 wherein each fluid device includes a piston and cylinder operatively connecting the load and the structure.

6. Apparatus as claimed in claim 5 including carriage means between the load and each fluid device, connecting means for connecting said load to said carriage means, and guide means for guiding said carriage means.

7. Apparatus as claimed in claim 6 wherein said connecting means is readily releasable.

8. In combination:
a first space craft having a cargo bay;
a second space craft removably received in said cargo bay;
a first set of complementary fastener means secured on the first space craft within the cargo bay;
a second set of complementary fastener means secured on the second space craft;
respective ones of the fastener means of the first set being configured to releasably engage respective ones of the fastener means of the second set to releasably mount the second space craft in the cargo bay of the first space craft;
for each pair of releasably engaged fastener means, a closed fluid-filled cylinder having a piston slidably received therein, having rod means projecting through the cylinder, each such fluid-filled cylinder, piston and rod constituting a fluid device, these fluid devices being angularly spaced from one another about the second space craft and having their longitudinal axes substantially parallel;
each fluid device being interposed between a respective one of said fastener means and the securement thereof on the respective space craft;
first conduit means interconnecting each of said cylinders with another of said cylinders on corresponding same sides of the respective pistons;
and second conduit means interconnecting the same cylinders which are interconnected by the first conduit means, but on corresponding opposite sides of the respective pistons, whereby;
as an elaboration on the releasable fastening of the second space craft to the first space craft by the releasable engagement of the fastener means, the interconnected fluid means resist similarly directed movements between angularly spaced points corresponding to the dispositions of the fastener means whose securements incorporate the interconnected cylinders on the second space craft relative to the first space craft, but permit limited differentially directed movements between those points.

9. The apparatus of claim 8 further including:
for each first-mentioned fluid device, a second, substantially like fluid device, aligned on an axis orthogonal to that of the respective first-mentioned fluid device associated therewith;
each second fluid device also being interposed between a respective one of said fastener means and the securement thereof on the respective space craft, in series with the associated first-mentioned fluid device;
third conduit means interconnecting each of said cylinders of the second fluid devices with another of said cylinders of the second fluid devices on corresponding same sides of the respective pistons; and fourth conduit means interconnecting the same cylinders which are interconnected by the third conduit means, but on corresponding opposite sides of the respective pistons.

* * * * *